(12) United States Patent
Mayville et al.

(10) Patent No.: US 10,800,340 B1
(45) Date of Patent: Oct. 13, 2020

(54) MULTI-FUNCTION VEHICLE CARGO MANAGEMENT SYSTEMS

(71) Applicant: FORD GLOBAL TECHNOLOGIES, LLC, Dearborn, MI (US)

(72) Inventors: Jeffrey Scott Mayville, Ypsilanti, MI (US); James Brian Slemons, Waterford, MI (US); Tim Farmer, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/452,941

(22) Filed: Jun. 26, 2019

(51) Int. Cl.
*B60R 9/045* (2006.01)
*B60P 7/06* (2006.01)
*B62D 33/02* (2006.01)
*B60R 9/058* (2006.01)
*B60R 9/06* (2006.01)
*B60P 7/08* (2006.01)

(52) U.S. Cl.
CPC .............. *B60R 9/045* (2013.01); *B60R 9/058* (2013.01); *B60R 9/06* (2013.01); *B62D 33/0207* (2013.01); *B60P 7/0815* (2013.01)

(58) Field of Classification Search
CPC ....... B60R 9/045; B60R 9/058; B60P 7/0815; B62D 33/0207
USPC .......................... 224/402, 403, 405, 309–331
See application file for complete search history.

(56) References Cited

U.S. PATENT DOCUMENTS

| | | | | |
|---|---|---|---|---|
| 4,630,990 A | * | 12/1986 | Whiting | B60R 9/042 224/310 |
| 4,957,400 A | * | 9/1990 | Karp | B60R 9/00 224/309 |
| 5,494,327 A | * | 2/1996 | Derecktor | B60P 3/40 224/321 |
| 6,105,841 A | | 8/2000 | Aftanas | |
| 7,874,774 B2 | * | 1/2011 | Peterson | B60P 7/0815 410/104 |
| 7,878,743 B2 | | 2/2011 | Aftanas | |
| 8,052,019 B2 | * | 11/2011 | Plavetich | B60P 3/06 224/403 |
| 8,864,001 B2 | | 10/2014 | Langseder | |
| 9,623,787 B2 | * | 4/2017 | Sterling | B60P 7/0807 |
| 2003/0080167 A1 | * | 5/2003 | Kmita | B60R 9/00 224/321 |
| 2008/0121671 A1 | * | 5/2008 | Cronce | B60R 9/058 224/331 |
| 2010/0072237 A1 | | 3/2010 | Green | |
| 2010/0096874 A1 | | 4/2010 | Brogdon | |
| 2020/0148281 A1 | * | 5/2020 | Elder | B60R 9/058 |

* cited by examiner

*Primary Examiner* — Justin M Larson
(74) *Attorney, Agent, or Firm* — David Coppiellie; Carlson, Gaskey & Olds

(57) ABSTRACT

This disclosure details multi-function cargo management systems for managing and securing cargo on vehicles. An exemplary vehicle cargo management system includes a first configuration (e.g., a tie down assembly) for securing a cargo item within a cargo space (e.g., truck bed, trunk, frunk, etc.) of the vehicle, and includes a second configuration (e.g., a roof rack assembly) for securing the cargo item on the roof of the vehicle.

18 Claims, 4 Drawing Sheets

US 10,800,340 B1

MULTI-FUNCTION VEHICLE CARGO MANAGEMENT SYSTEMS

TECHNICAL FIELD

This disclosure relates to vehicle cargo management systems that facilitate securing cargo at different locations on vehicles.

BACKGROUND

Vehicles typically include cargo spaces for transporting various types of cargo. Roof rack systems may be secured to vehicle roofs for transporting cargo on the vehicle roofs.

SUMMARY

A vehicle according to an exemplary aspect of the present disclosure includes, among other things, a roof, a cargo space, and a cargo management system for securing a cargo item either within the cargo space or on the roof. In a first configuration, the cargo management system is configured as a tie down assembly for securing the cargo item within the cargo space. In a second configuration, the cargo management system is configured as a roof rack assembly for securing the cargo item on the roof.

In a further non-limiting embodiment of the foregoing vehicle, the vehicle is a pickup truck and the cargo space is a truck bed.

In a further non-limiting embodiment of either of the foregoing vehicles, the cargo management system includes a rail and a cleat.

In a further non-limiting embodiment of any of the foregoing vehicles, in the first configuration, the rail is mounted to the cargo space with a threaded fastener that is passed through the rail, and in the second configuration, the rail is mounted to the roof with the threaded fastener, and the threaded fastener is passed through a pass-through opening of the cleat.

In a further non-limiting embodiment of any of the foregoing vehicles, in the first configuration, the cleat is parallel to the rail, and in the second configuration, the cleat is perpendicular to the rail.

In a further non-limiting embodiment of any of the foregoing vehicles, the cargo management system includes a cleat that includes a pair of wings. Each wing of the pair of wings includes a pass-through opening.

In a further non-limiting embodiment of any of the foregoing vehicles, the pass-through opening is formed in a flattened portion of each of the wings.

In a further non-limiting embodiment of any of the foregoing vehicles, the cargo management system includes a threaded nut secured to the roof.

In a further non-limiting embodiment of any of the foregoing vehicles, the threaded nut is received within an upper channel of a side rail that is mounted to the roof.

In a further non-limiting embodiment of any of the foregoing vehicles, the threaded nut is mounted to a roof panel of the roof.

In a further non-limiting embodiment of any of the foregoing vehicles, the cargo management system includes at least two rail and cleat assemblies, and in the second configuration, the rail and cleat assemblies are secured to the roof by a combination of threaded fasteners and threaded nuts.

In a further non-limiting embodiment of any of the foregoing vehicles, the threaded fasteners are received through cleats of the at least two rail and cleat assemblies, and the threaded nuts are mounted within a roof structure of the roof.

A method according to another exemplary aspect of the present disclosure includes, among other things, removing a rail and cleat assembly of a vehicle cargo management system from a cargo space of a vehicle, mounting the rail and cleat assembly to a roof of the vehicle, securing a tying device to the rail and cleat assembly, and securing a cargo item relative to the roof with the tying device.

In a further non-limiting embodiment of the foregoing method, the method includes removing the rail and cleat assembly from the roof, mounting the rail and cleat assembly to the cargo space, and securing a second cargo item within the cargo space with the tying device or a second tying device.

In a further non-limiting embodiment of either of the foregoing methods, removing the rail and cleat assembly from the cargo space includes removing a plurality of threaded fasteners from a rail of the rail and cleat assembly.

In a further non-limiting embodiment of any of the foregoing methods, mounting the rail and cleat assembly to the roof includes inserting a threaded fastener through a pass-through opening formed in a wing of a cleat of the rail and cleat assembly and screwing the threaded fastener into a threaded nut mounted to a roof structure of the roof.

In a further non-limiting embodiment of any of the foregoing methods, the method includes, prior to mounting the rail and cleat assembly to the roof, repositioning a cleat of the rail and cleat assembly relative to a rail of the rail and cleat assembly.

In a further non-limiting embodiment of any of the foregoing methods, repositioning the cleat includes rotating the cleat to a position that is about perpendicular to the rail.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details multi-function cargo management systems for managing and securing cargo on vehicles. An exemplary vehicle cargo management system includes a first configuration (e.g., a tie down assembly) for securing a cargo item within a truck bed or other cargo space of the vehicle, and includes a second configuration (e.g., a roof rack assembly) for securing the cargo item on the roof of the vehicle. These and other features of this disclosure are described in greater detail in the following paragraphs of this detailed description.

Figure 1:
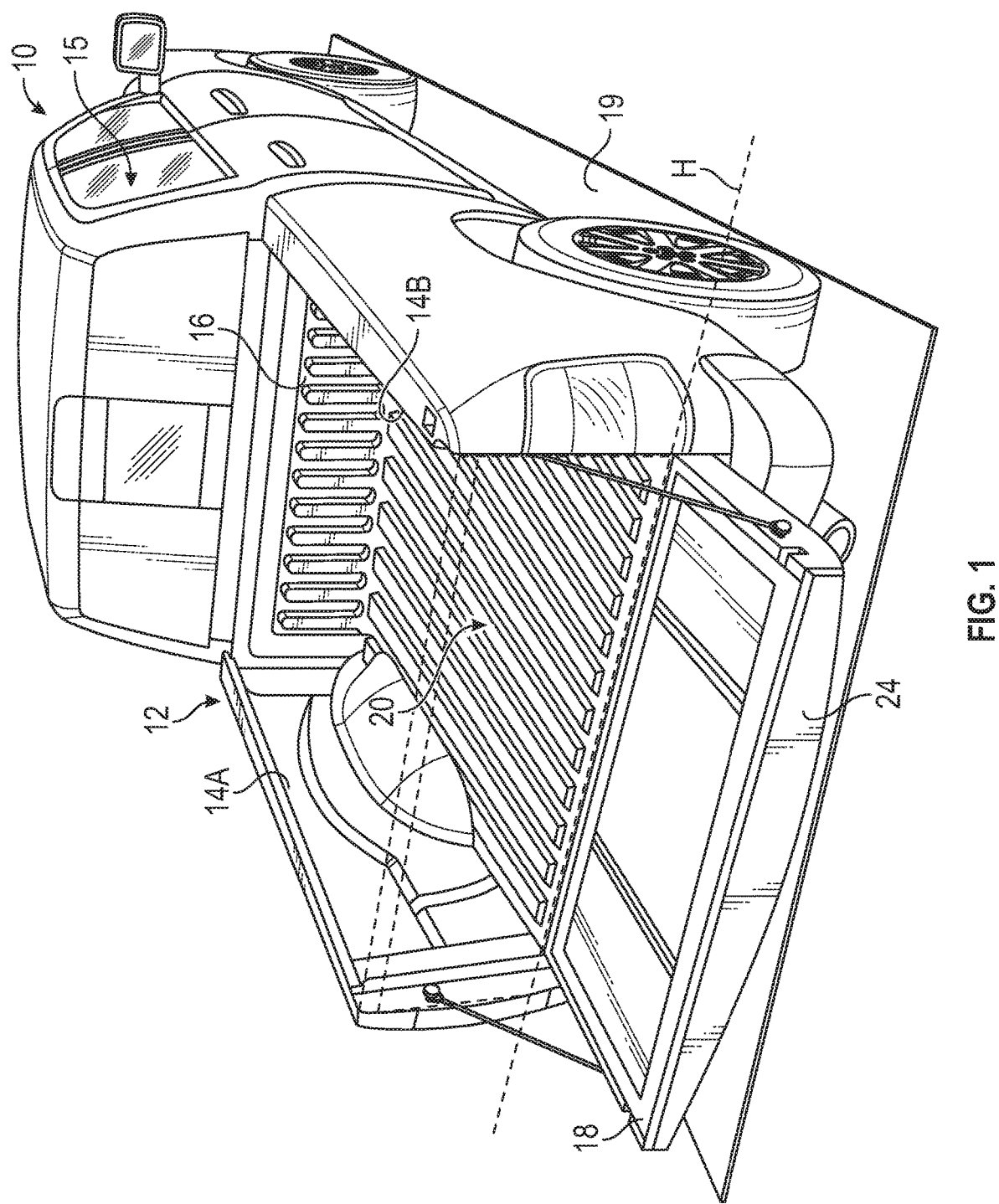
FIG. 1 illustrates a vehicle equipped with a cargo space for storing and hauling cargo.

FIG. 1 schematically illustrates select portions of a vehicle 10. In the illustrated embodiment, the vehicle 10 is a pickup truck. While a pickup truck is specifically pictured and referenced herein, other vehicles could also benefit from the teachings of this disclosure. For example, the exemplary cargo management systems of this disclosure could be used to secure cargo on or within any vehicle cargo space.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a truck bed 12 that establishes a cargo space for storing and hauling cargo on the vehicle 10. The truck bed 12 is generally rearward of a passenger cabin 15 of the vehicle 10 and includes a floor 20 extending between a pair of longitudinally extending side walls 14A, 14B, a laterally extending front wall 16, and a tailgate 18.

The tailgate 18 is moveable between a closed position (shown in phantom) and a deployed or open position. When in the closed position, the tailgate 18 generally encloses an end of the truck bed 12 that is opposite from the front wall 16 to prevent cargo from sliding out of the truck bed 12. The tailgate 18 may be pivoted about a generally horizontal axis H to move it from the closed position to the open position and provide access to the truck bed 12. When in the open position, the tailgate 18 is generally horizontal and is parallel to a ground level 19 such that cargo can be loaded onto or unloaded from the truck bed 12.

The vehicle 10 further includes a roof 22. The roof 22 establishes an upper barrier surface for enclosing the passenger cabin 15. The roof 22 may additionally establish a cargo space for hauling additional cargo.

The owner or user of the vehicle 10 may wish to transport various types of cargo using the vehicle 10 and may therefore desire flexibility for storing and securing cargo on the vehicle 10. For example, the owner or user may wish to load, secure, and transport cargo either within a cargo space of the vehicle 10 or on the roof 22. Vehicle cargo management systems that provide the owner/user with greater storage and tie down flexibility are therefore proposed in this disclosure.

Figure 2:
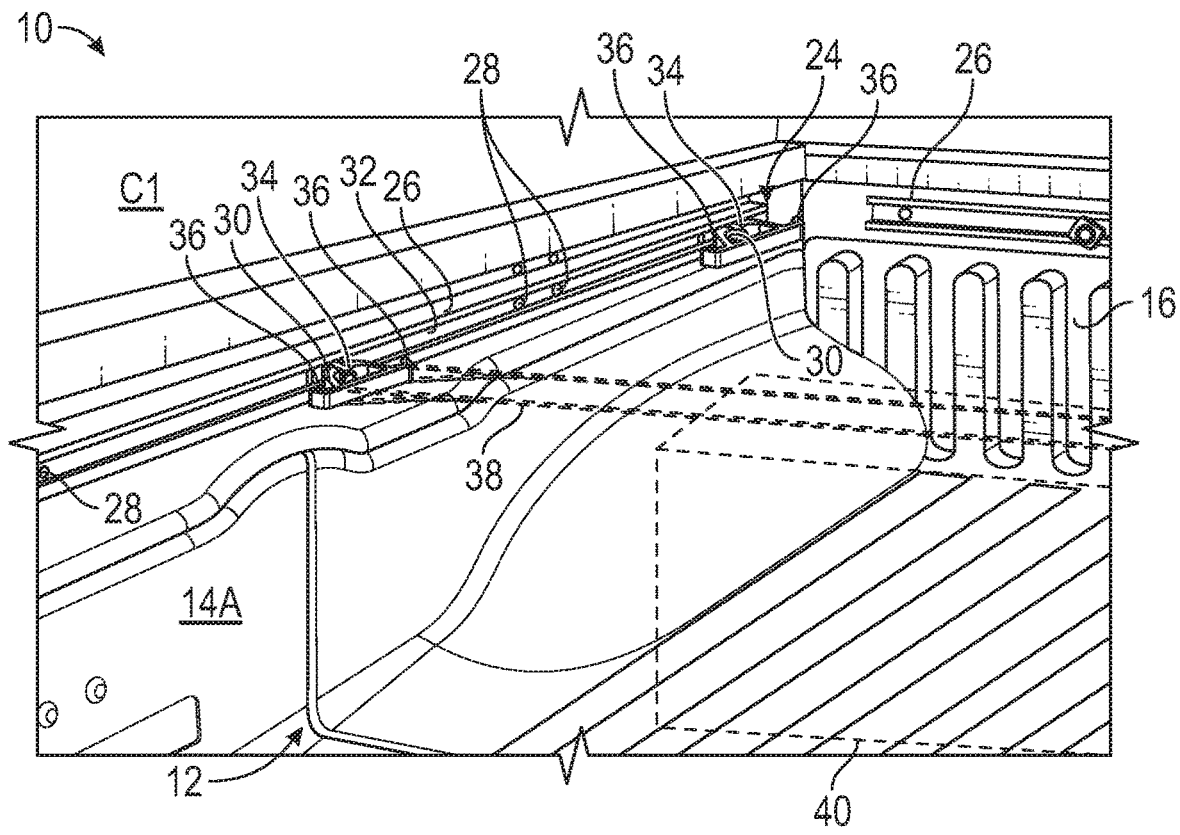
FIG. 2 illustrates a first configuration of a cargo management system of a vehicle. In the first configuration, the cargo management system is configured as a tie down assembly for securing cargo within a truck bed or other cargo space of the vehicle.

FIG. 2 illustrates a first configuration C1 of an exemplary cargo management system 24 for a vehicle 10, such as the vehicle 10 of FIG. 1. In the first configuration C1, the cargo management system 24 is configured as a tie down assembly for securing (i.e., tying down) cargo items within the truck bed 12. Although a rear located truck bed 12 is specifically shown in this embodiment, the cargo management system 24 could be employed within any vehicle cargo space, including trunks and front trunks (i.e., frunks).

The cargo management system 24 may include one or more rails 26. In an embodiment, one rail 26 is removably secured to each of the side walls 14A, 14B of the truck bed 12 (for simplicity, only side wall 14A is shown in FIG. 2). An additional rail 26 could optionally be removably mounted to the laterally extending front wall 16. The total number of rails 26 utilized by the cargo management system 24 in the first configuration C1 is not intended to limit this disclosure.

Each rail 26 may be removably mounted to the side wall 14A, the side wall 14B, or the front wall 16 using one or more threaded fasteners 28. In an embodiment, the threaded fasteners 28 are bolts. In another embodiment, the threaded fasteners 28 are screws. Other mechanical fasteners may also be suitable and are contemplated within the scope of this disclosure.

One or more cleats 30 may be slidably received within a track 32 of each rail 26. The rail 26 and the cleats 30 may be collectively referred to as a rail and cleat assembly.

Each cleat 30 may include a thumbwheel 34 and a pair of wings 36. The thumbwheel 34 may be adjusted to fix a positioning of the cleat 30 within the track 32. The wings 36 establish attachment points for removably securing one or more tying devices 38 (shown in phantom in FIG. 2) to the truck bed 12. Once connected to two or more cleats 30, the tying devices 38 may exert a force for securing a cargo item 40 within the truck bed 12. The tying device(s) 38 could be a strap, cord, bungee cord, cable, rope, band, or any combination of these or other tying devices. The cargo item 40 could be any cargo that the owner of the vehicle 10 desires to haul within the truck bed 12. Although shown as tying down a single cargo item 40 in FIG. 2, the cargo management system 24 could be employed to simultaneously tie down a plurality of cargo items.

Figure 3:
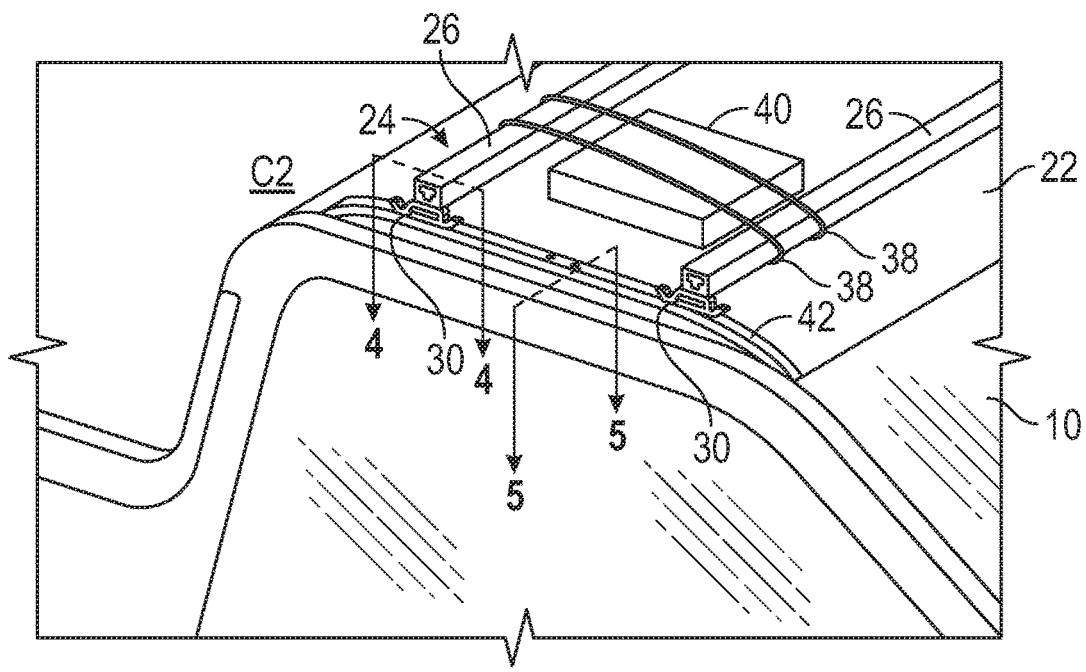
FIG. 3 illustrates a second configuration of the cargo management system of FIG. 2. In the second configuration, the cargo management system is configured as a roof rack assembly for securing cargo to a roof of the vehicle.

FIG. 3 illustrates a second configuration C2 of the exemplary cargo management system 24. In the second configuration C2, the cargo management system 24 is configured as a roof rack assembly for securing (e.g., tying down) cargo items 40 on the roof 22 of the vehicle 10.

The cargo management system 24 may be positioned in the second configuration C2 by removing two or more of the rails 26 from the truck bed 12. Once removed from the truck bed 12, such as by unscrewing the threaded fasteners 28, each rail 26 may be rotated 90 degrees such that the track 32 faces downwardly toward the roof 22. Each rail 26 may then be secured relative to the roof 22 using two or more of the cleats 30. The total number of rails 26 and cleats 30 utilized by the cargo management system 24 in the second configuration C2 is not intended to limit this disclosure.

In an embodiment, one cleat 30 is positioned on each opposing side of the roof 22 and is rotated to a mounting position such that a longitudinal axis of the cleat 30 is generally perpendicular to the rail 26. In the second configuration C2, the cleats 30 may mountably support the rails 26 above the roof 22. As further detailed below, the cleats 30 may be secured to vehicle roof structure 42, such as a roof side rail or a roof panel.

Once configured in the second configuration C2, the cargo management system 24 can be used to secure one or more cargo items 40 to the roof 22, such as by using one or more tying devices 38. The tying devices 38 may be wrapped around the rails 26 and/or the cleats 30 to facilitate securing the cargo 40.

Figure 4:
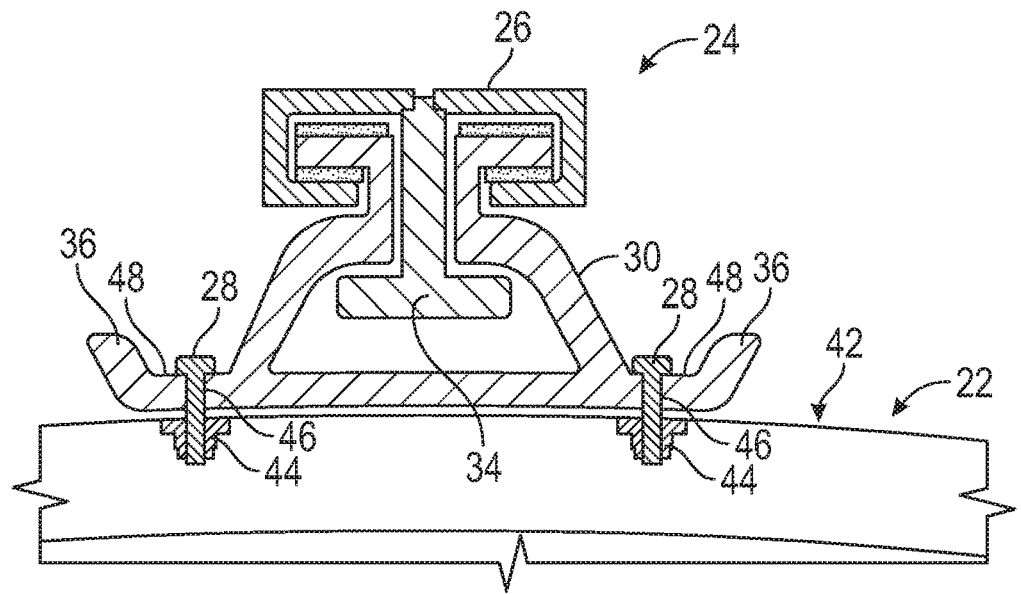
FIG. 4 is a cross-sectional view through section 4-4 of FIG. 3.

Referring now to FIG. 4, one of the cleats 30 of the cargo management system 24 is illustrated mounted to a roof structure 42 of the roof 22. In an embodiment, the roof structure 42 is a side rail that is secured to the roof 22. In another embodiment, the roof structure 42 is a section of a roof panel of the roof 22. In the mounted position, the rail 26 may be oriented perpendicular relative to the roof structure 42.

A plurality of threaded nuts 44 may be embedded or otherwise secured within the roof structure 42. In an embodiment, the threaded nuts 44 are rivet nuts. In another embodiment, the threaded nuts 44 are weld nuts. The threaded nuts 44 may receive threaded fasteners 28 for removably securing the cleats 30 relative to the roof 22. In an embodiment, the same threaded fasteners 28 may be used to mount the rails 26 to both the truck bed 12 and the roof 22. Therefore, a common set of hardware can be employed for both the first configuration and the second configuration of the cargo management system 24.

The wings 36 of the cleats 30 may include pass-through openings 46 for receiving the threaded fasteners 28. The threaded fasteners 28 may be received through the pass-through openings 46 and may then screw into the threaded nuts 44 in order to secure the cleats 30, and thus the rails 26, relative to the roof 22. Each wing 36 may include one or more of the pass-through openings 46, the total number of which is not intended to limit this disclosure. In an embodiment, the pass-through openings 46 are provided in a flattened portion 48 of each wing 36 in order to better match the adjoining surface of the roof structure 42.

Figure 5:
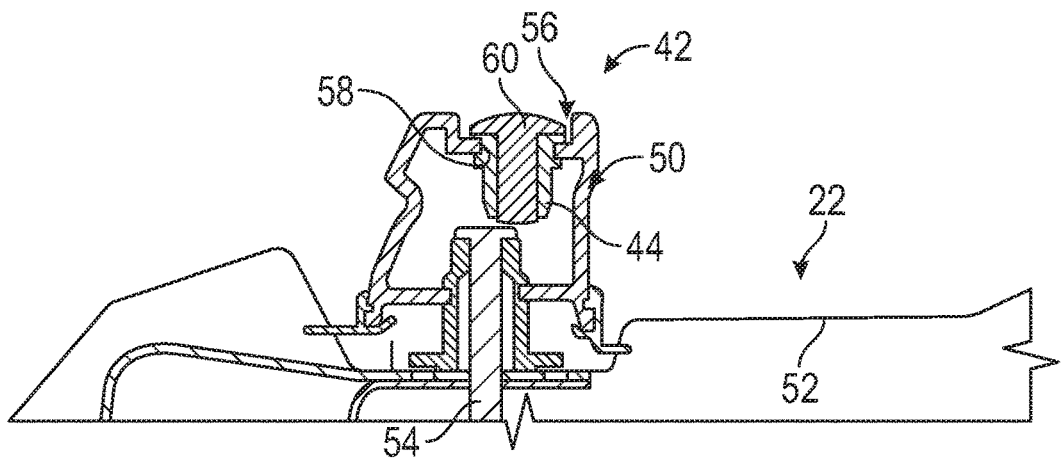
FIG. 5 is a cross-sectional view through section 5-5 of FIG. 3.

FIG. 5 illustrates an exemplary embodiment in which the roof structure 42 that receives the threaded nut 44 is a separate side rail 50 that is secured to a roof panel 52 of the roof 22. In an embodiment, the side rail 50 is an extruded rail. In another embodiment, the side rail 50 is an injection molded rail. In yet another embodiment, the side rail 50 is a case or die cast rail. The side rail 50 may be mounted to the roof panel 52 using one or more fasteners 54.

The side rail 50 may include an upper channel 56. The upper channel 56 may include an opening 58 for receiving the threaded nut 44. A plug 60 may be positioned within the threaded nut 44 when a cleat 30 is not mounted thereto.

Figure 6:
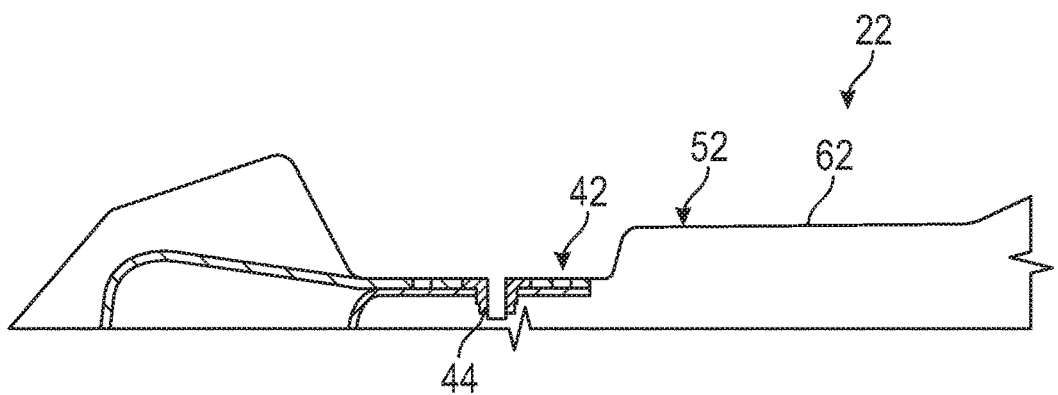
FIG. 6 illustrates an exemplary roof mounting configuration of a cargo management system.

FIG. 6 illustrates another exemplary embodiment in which the roof structure 42 that receives the threaded nut 44 is a roof panel 52 of the roof. In this embodiment, the threaded nut 44 is mounted directly to the roof panel 52. In an embodiment, the threaded nut 44 is welded to the roof panel 52 such that it is recessed relative to an exterior surface 62 of the roof panel 52.

Figure 7:
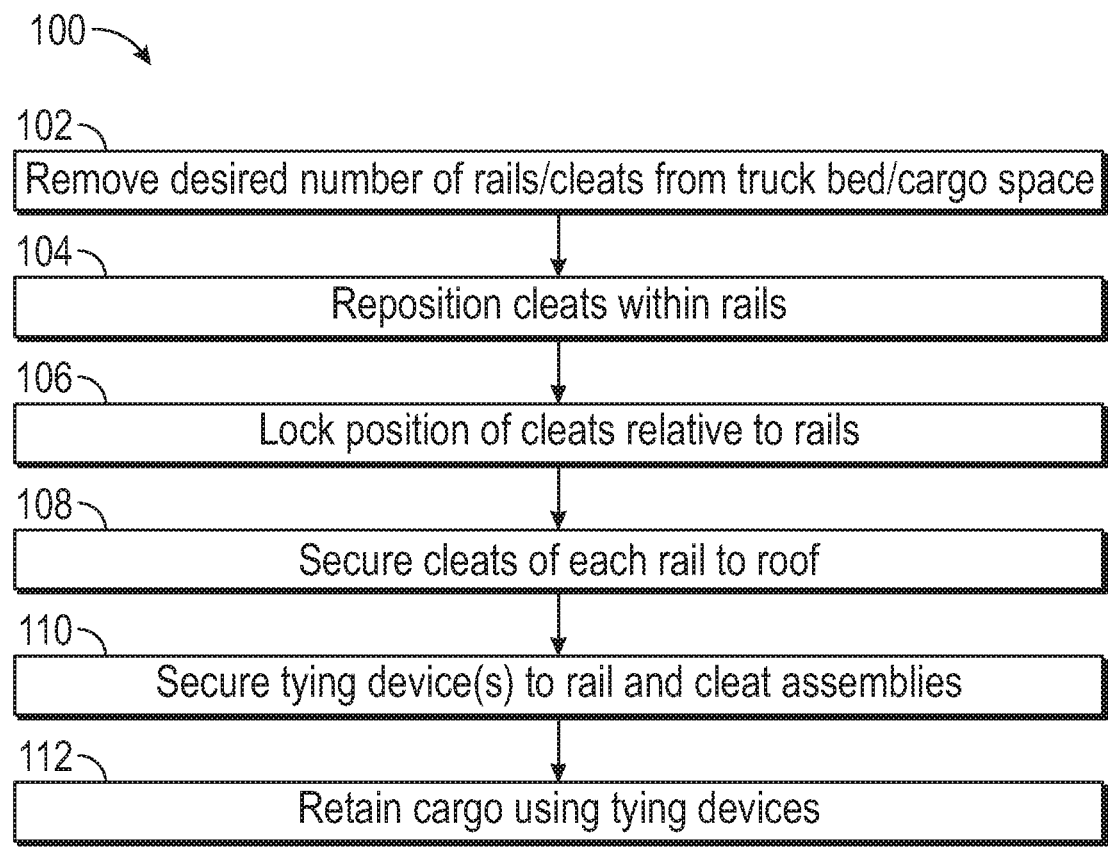
FIG. 7 schematically illustrates a method of using a vehicle cargo management system on a vehicle.

FIG. 7, with continued reference to FIGS. 1-6, schematically illustrate an exemplary method 100 for using the cargo management system 24 on the vehicle 10. The following sequence of steps assumes that the cargo management system 24 is secured to the truck bed 12, or some other vehicle cargo space, when beginning the method 100. However, the opposite situation is also within the scope of this disclosure in which the cargo management system is secured to the roof 22 when beginning the method 100 and is then removed and attached to the truck bed 12 for facilitating cargo management within the truck bed 12.

First, at block 102 of the method 100, a desired number of the rails 26 and cleats 30 may be removed from the truck bed 12 or some other vehicle cargo space (e.g., trunk, frunk, etc.). In an embodiment, at least two rail and cleat assemblies are removed from the truck bed 12. The rails 26 may be removed by removing the threaded fasteners 28.

Next, at block 104, the cleats 30 may be repositioned within each of the removed rails 26. In an embodiment, one cleat 30 is positioned near each opposing end of each rail 26, and the cleat 30 may then be rotated to a position that is about perpendicular to the rail 26. The cleats 30 may be easily slid to a desired positioning within the tracks 32. The positioning of the cleats 30 may be locked relative to the rails 26 by adjusting the thumbwheels at block 106.

At block 108, the cleats 30 may be secured at a desired location of the roof 22. In an embodiment, the threaded fasteners 28 that are removed during block 102 may be reused to secure the cleats 30 to the roof structure 42 (e.g., via the threaded nuts 44). Securing the cleats 30 in this manner positions the rails 26 in a manner that laterally extends across the roof 22. This effectively transforms the cargo management system 24 into a roof rack system.

One or more tying devices 38 may be secured to one or more rail and cleat assemblies of the cargo management system 24 at block 110. Finally, at block 112, the tying devices 38 may be used to secure one or more cargo items 40 atop the roof 22.

The multi-function cargo management systems of this disclosure provide users with the ability to secure cargo at various locations of the vehicle using a common set of hardware (e.g., one or more rail and cleat assemblies and interchangeable fasteners), thereby potentially eliminating the need for users to purchase separate relatively expensive aftermarket systems for each different cargo space. The proposed multi-function cargo management systems may further eliminate the need to store the cargo management system separately from the vehicle when not being used for cargo management.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
   a roof;
   a cargo space; and
   a cargo management system for securing a cargo item either within the cargo space or on the roof,
   wherein, in a first configuration, the cargo management system is configured as a tie down assembly for securing the cargo item within the cargo space,
   wherein, in a second configuration, the cargo management system is configured as a roof rack assembly for securing the cargo item on the roof.

2. The vehicle as recited in claim 1, wherein the vehicle is a pickup truck and the cargo space is a truck bed.

3. The vehicle as recited in claim 1, wherein the cargo management system includes a rail and a cleat.

4. The vehicle as recited in claim 3, wherein, in the first configuration, the rail is mounted to the cargo space with a threaded fastener that is passed through the rail, and in the second configuration, the rail is mounted to the roof with the threaded fastener, and the threaded fastener is passed through a pass-through opening of the cleat.

5. The vehicle as recited in claim 3, wherein, in the first configuration, the cleat is parallel to the rail, and in the second configuration, the cleat is perpendicular to the rail.

6. The vehicle as recited in claim 1, wherein the cargo management system includes a cleat that includes a pair of wings, and wherein each wing of the pair of wings includes a pass-through opening.

7. The vehicle as recited in claim 6, wherein the pass-through opening is formed in a flattened portion of each of the wings.

8. The vehicle as recited in claim 1, wherein the cargo management system includes a threaded nut secured to the roof.

9. The vehicle as recited in claim 8, wherein the threaded nut is received within an upper channel of a side rail that is mounted to the roof.

10. The vehicle as recited in claim 8, wherein the threaded nut is mounted to a roof panel of the roof.

11. The vehicle as recited in claim 1, wherein the cargo management system includes at least two rail and cleat assemblies, and in the second configuration, the rail and cleat assemblies are secured to the roof by a combination of threaded fasteners and threaded nuts.

12. The vehicle as recited in claim 11, wherein the threaded fasteners are received through cleats of the at least two rail and cleat assemblies, and the threaded nuts are mounted within a roof structure of the roof.

13. A method, comprising:
    removing a rail and cleat assembly of a vehicle cargo management system from a cargo space of a vehicle;
    mounting the rail and cleat assembly to a roof of the vehicle;
    securing a tying device to the rail and cleat assembly; and
    securing a cargo item relative to the roof with the tying device.

14. The method as recited in claim 13, comprising:
    removing the rail and cleat assembly from the roof;
    mounting the rail and cleat assembly to the cargo space; and
    securing a second cargo item within the cargo space with the tying device or a second tying device.

15. The method as recited in claim 13, wherein removing the rail and cleat assembly from the cargo space includes:
    removing a plurality of threaded fasteners from a rail of the rail and cleat assembly.

16. The method as recited in claim 13, wherein mounting the rail and cleat assembly to the roof includes:
    inserting a threaded fastener through a pass-through opening formed in a wing of a cleat of the rail and cleat assembly; and
    screwing the threaded fastener into a threaded nut mounted to a roof structure of the roof.

17. The method as recited in claim 13, comprising:
    prior to mounting the rail and cleat assembly to the roof, repositioning a cleat of the rail and cleat assembly relative to a rail of the rail and cleat assembly.

18. The method as recited in claim 17, wherein repositioning the cleat includes:
    rotating the cleat to a position that is about perpendicular to the rail.

\* \* \* \* \*